United States Patent
Nuestro et al.

(10) Patent No.: US 9,148,506 B2
(45) Date of Patent: *Sep. 29, 2015

(54) METHOD AND SYSTEM FOR PROCESSING APPLICATION LOGS

(71) Applicant: AT&T Intellectual Property I, L.P., Atlanta, GA (US)

(72) Inventors: Marcialito V. Nuestro, Livermore, CA (US); Rahul Anandani, Schaumburg, IL (US); Kevin J. Murray, Pleasant Prairie, WI (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 140 days.

This patent is subject to a terminal disclaimer.

(21) Appl. No.: 13/677,065

(22) Filed: Nov. 14, 2012

(65) Prior Publication Data
US 2013/0070917 A1    Mar. 21, 2013

Related U.S. Application Data

(63) Continuation of application No. 12/337,344, filed on Dec. 17, 2008, now Pat. No. 8,320,551.

(51) Int. Cl.
| | |
|---|---|
| H04M 15/00 | (2006.01) |
| H04M 3/36 | (2006.01) |
| H04M 3/51 | (2006.01) |
| H04M 3/493 | (2006.01) |

(52) U.S. Cl.
CPC .............. *H04M 3/36* (2013.01); *H04M 3/5191* (2013.01); *H04M 3/493* (2013.01)

(58) Field of Classification Search
USPC .................... 379/112.06, 242, 266.1, 265.02, 379/265.03, 167.12, 428.03, 112.07, 88.11, 379/32.05
See application file for complete search history.

(56) References Cited

U.S. PATENT DOCUMENTS

| | | | |
|---|---|---|---|
| 6,236,723 B1 | 5/2001 | Fischer | |
| 2001/0040942 A1* | 11/2001 | Glowny et al. | ............ 379/88.22 |
| 2004/0083292 A1* | 4/2004 | Lueckhoff et al. | ............ 709/227 |
| 2006/0095568 A1 | 5/2006 | Makagon et al. | |
| 2010/0274792 A1* | 10/2010 | Bhangi | ........................ 707/754 |

* cited by examiner

*Primary Examiner* — Yosef K Laekemariam
(74) *Attorney, Agent, or Firm* — Scott P. Zimmerman, PLLC

(57) ABSTRACT

A method and system for processing application logs describing transactions in a computer telephony integration (CTI) environment is disclosed. The CTI environment includes a plurality of CTI servers configured to execute CTI applications. Numerous instances or types of CTI applications may be executed. A user may request information for a transaction performed in the CTI environment. The relevant application logs indicating the transaction may be determined and output. Information indicating the relevant application logs may be output to the user.

20 Claims, 4 Drawing Sheets

METHOD AND SYSTEM FOR PROCESSING APPLICATION LOGS

The present patent application is a continuation of U.S. patent application Ser. No. 12/337,344, filed Dec. 17, 2008, the entirety of which is hereby incorporated by reference.

BACKGROUND

1. Field of the Disclosure

The present disclosure relates to application logs and, more particularly, to processing application logs in multi-server environments.

2. Description of the Related Art

Complex business systems, such as computer telephony integration (CTI) platforms, may comprise numerous servers running a plurality of applications. A complex business system may accordingly generate a large number of logs reflecting the activity of individual applications.

DESCRIPTION OF EXEMPLARY EMBODIMENTS

Figure 1:
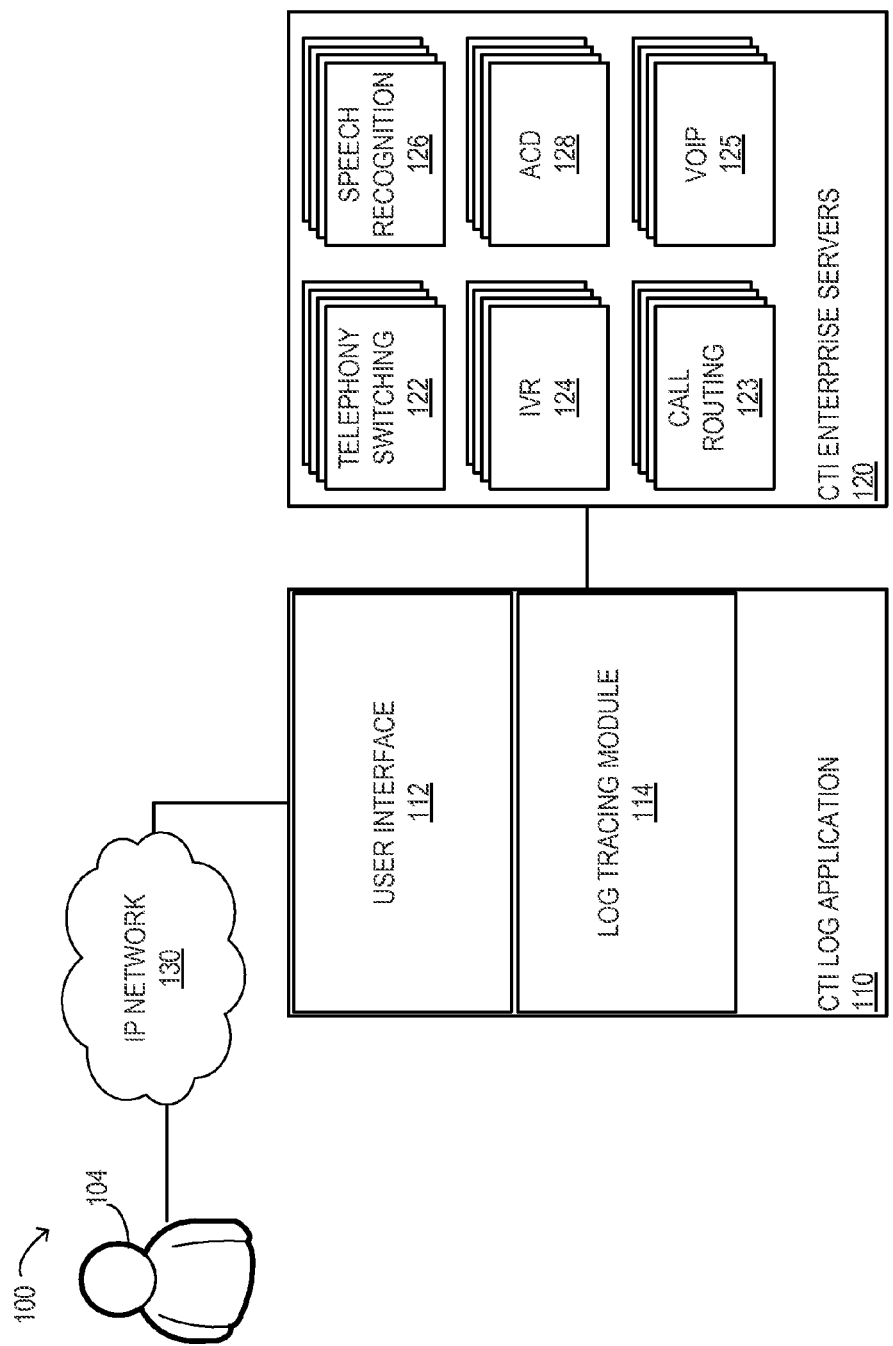
FIG. 1 is a block diagram of selected elements of a CTI environment.

Automated processing of transactions is a key aspect to many complex business systems. For those complex business systems that operate in a multi-server environment, many different types and/or instances of applications may be used to process transactions. Applications that process transactions may generate to files, or other records, entries, etc., that provide a stored indication of the processed transactions. The logs, also referred to herein as "application logs" or "transaction logs" or "application transaction logs" may be useful for tracking or debugging purposes, and for tracing individual processed transactions. In a multi-server environment, where multiple instances of servers and applications may be configured to handle a large transaction volume, a corresponding large volume of data may be recorded in a number of different transaction logs during operation.

One example of such a complex business system is a CTI environment, which may be configured to process a large number of transactions involving phone calls. A typical CTI environment may provide various kinds of automated and/or interactive telephony service, such as but not limited to interactive voice response (IVR), speech recognition, and automated call distribution (ACD) in a call center. The CTI environment may include different CTI applications, which may generate transaction logs indicating when and where phone calls have been processed. The transaction logs may further include additional information associated with the phone calls in a CTI environment, such as specific actions performed by the caller or a CTI application.

In one aspect, a disclosed method for processing application logs in a CTI environment may include receiving a request for information associated with a transaction performed in the CTI environment. Responsive to the request, the method may also include retrieving a first plurality of transaction logs from a respective first plurality of applications in the CTI environment. The method may further include determining a second plurality of transaction logs by determining which of the first plurality of transaction logs includes an indication of the transaction, and display information indicating the second plurality of transaction logs.

In some embodiments, the displayed information may include information indicating a respective second plurality of applications corresponding to the second plurality of transaction logs. The first plurality of applications may include applications executing on different servers in the CTI environment. The retrieving may include automatically logging on to at least one server in the CTI environment. The transaction may be a phone call processed in the CTI environment. The phone call may be an incoming phone call.

In some instances, the first plurality of applications may include multiple instances of the same application executing on different servers in the CTI environment. Determining the second plurality of transaction logs may include searching the first plurality of transaction logs based on a trace key-value pair. The trace key-value pair may be at least one of a connection identifier, a call identifier, a caller identifier, a date/time identifier, and a CTI environment identifier.

In another aspect, a disclosed system for analyzing transactions in a CTI environment includes a processor, and memory media accessible to the processor, including processor executable instructions. The processor instructions may be executable to receive a request indicating a transaction performed in the CTI environment, wherein the request specifies a trace key-value pair. Based on the trace key-value pair, the instructions may further be executable to execute at least one trace script, wherein the at least one trace script includes processor executable instructions to retrieve at least one application transaction log for a CTI application in the CTI environment, and determine which of the at least one application transaction logs references the trace key-value pair.

In some cases, the system further includes processor executable instructions to output an indication of the at least one application logs referencing the trace key-value pair. The request is received from a web browser and the indication is output to the web browser in hypertext markup language (HTML) format. The instructions to retrieve include instructions to automatically logon to a server in the CTI environment, and access application log data stored on the server. The at least one trace script may specify the server and access information for the application log data. The access information may include a file-system directory identifier of a file containing the application log data. The application log data may be stored in a database and the access information includes a database object identifier. The instructions to retrieve may include instructions to decompress a compressed application transaction log.

In certain embodiments, each of the at least one trace scripts may correspond to a CTI application type selected from: an IVR application type, a speech recognition application type, an ACD application type, a voice-over-Internet protocol (VOIP) application type, a call routing application type, and a telephony switching application type. The trace key-value pair may be at least one of a connection identifier, a call identifier, a caller identifier, a date/time identifier, and a CTI environment identifier.

In still another aspect, a disclosed computer-readable memory media includes processor executable instructions for processing application logs in a CTI environment. The instructions may be executable to retrieve a plurality of transaction logs by automatically logging on to at least one server in the CTI environment, and receive user input specifying a trace key-value pair associated with a transaction processed in the CTI environment. The instructions may further be executable to identify relevant transactions represented in the plurality of transaction logs based on the trace key-value pair, and enable a user to access information representing the relevant transactions. The trace key-value pair may be at least one of a connection identifier, a call identifier, a caller identifier, a date/time identifier, and a CTI environment identifier. The relevant transactions may include telephone calls processed by the CTI environment.

In certain embodiments, the CTI environment may include a plurality of remote servers executing at least one type of CTI application, while said instructions to retrieve may further include instructions executable to access at least one file-system directory on each of the plurality of remote servers. The type of CTI application may be selected from an IVR application, a speech recognition application, an ACD application, a VOIP application, a call routing application, and a telephony switching application, while wherein said instructions to access may further include instructions executable to retrieve at least one transaction log for a CTI application from the at least one file system directory. The memory media may further include instructions executable to output information representing the relevant transactions in HTML format.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Referring now to FIG. 1, a block diagram of selected elements of CTI environment 100 is illustrated. CTI environment 100, as depicted in FIG. 1, is a support platform for analyzing CTI transactions. In CTI environment 100, user 104 is depicted operating CTI log application 110. User 104 may access CTI log application 110 over Internet-protocol (IP) network 130. In some cases, IP network 130 may be a public network, such as the Internet. In certain instances, at least a portion of IP network 130 may be a private network.

CTI log application 110 may comprise various internal modules and components. As shown in FIG. 1, CTI log application 110 includes user interface layer 112, which includes the logic and implementation to present an interface operable by user 104. In some embodiments, user interface layer 112 includes a graphical user interface. User interface layer 112 may be accessible by user 104 using a web browser (not shown in FIG. 1).

CTI log application 110 is shown in FIG. 1 also including log tracing module 114. Log tracing module 114 may provide logic and functionality for retrieving a plurality of log files from a number of applications, as will be described in detail below. For example, log tracing module 114 may be configured to execute scripts and access information about CTI enterprise servers 120 and CTI applications executing on such servers. Thus, CTI log application 110 may be executed on a computer system with a network adapter for accessing remote servers, and also for providing access to users.

CTI enterprise servers 120 represents a collection of servers, which are configured to host and execute a number of CTI applications. It is noted that CTI enterprise servers 120 may provide CTI functionality independent of CTI log application 110. As shown in FIG. 1, CTI enterprise servers 120 represent a component in CTI environment 100. CTI enterprise servers 120 may represent a collection of physical and/or virtual servers, each of which may be associated with at least one CTI application. Each server may be an independent computing environment having access to memory, processing resources and a storage system. Although a server may host and execute several CTI applications, in the embodiments of FIG. 1, each server is shown representing a distinct application for clarity.

In FIG. 1, CTI enterprise servers 120 are shown including six distinct types of CTI applications, as will be discussed below. In some embodiments, additional types of applications (not shown in FIG. 1) may be executed by CTI enterprise servers 120. In order to increase overall transaction capacity, multiple instances of the same CTI application type may be configured and operated in parallel on different servers. Accordingly, in FIG. 1, each CTI application is depicted as executing on multiple servers. Although four instances are shown in FIG. 1 to represent parallel implementations, each type of CTI application may be implemented in very large numbers, for example, on several hundred or more servers. It is also noted that the types of CTI applications depicted in FIG. 1 are exemplary, and may be selectively omitted in certain embodiments.

Telephony switching 122 is a CTI application that may control the routing and connection of phone calls on a telephone system, such as the Public Switched Telephone Network (PSTN), not shown in FIG. 1. Telephony switching 122 may communicate with and control electronic telephony switching equipment to forward calls or establish connections between telephone subscribers. Call routing 123 may provide additional functionality for routing calls between CTI applications, for example, between CTI enterprise servers 120. Thus call routing 123 may route calls in digital form over a network. VOIP 125 may provide conversion between analog or digital voice signals and a stream of IP packets for transmission over a network. In some instances, call routing 123 and VOIP 125 are combined into a single application for routing network packets representing voice calls.

IVR 124 is a CTI application for responding to incoming calls. IVR 124 may provide a voice prompt to greet a caller and provide instructions for selecting a suitable menu option. IVR 124 may then dispatch the incoming call to another CTI application depending on selections made by the caller. Speech recognition 126 may be invoked by other CTI applications, such as IVR 124, in order to interpret voice commands made by callers. Speech recognition 126 may be configured to respond by literally interpreting speech input, or by logically interpreting a voice command by comparison with the available options for a match.

ACD 128 is a CTI application for assigning calls to operators in a call center environment. ACD 128 may include an incoming queue of calls waiting to be assigned to an operator of a call center. ACD 128 may support automatic or user-driven distribution of calls to operators. Depending on the nature of the call, ACD 128 may route the call to another entity or service. In addition to routing the voice call, ACD 128 may simultaneously enable the receiving operator to receive electronic files specific to the identity of the caller. In some cases, ACD 128 may control an application for processing a transaction by the operator at the same time the call is passed to the operator.

Figure 2:
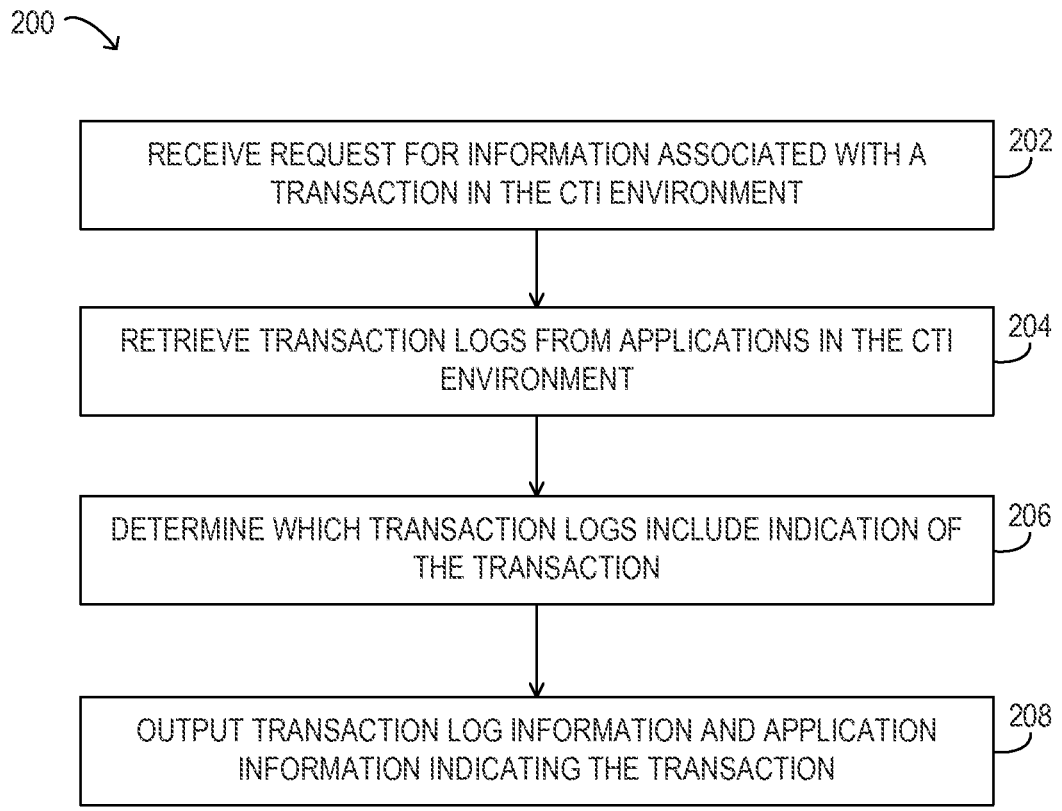
FIG. 2 is a block diagram of selected elements of an embodiment of a method for processing application logs.

Turning now to FIG. 2, a block diagram of selected elements of an embodiment of method 200 for processing application logs is illustrated. It is noted that CTI environment 100 may be configured to execute process 200. In particular, user 104 may interact with user interface layer 112 to perform process 200 and also to communicate with CTI enterprise servers 120.

A request for information associated with a transaction in the CTI environment may be received (operation 202). A user may send the request from a web browser. The transaction may be specified by various means. In some cases, an attribute or value associated with the transaction may be specified. One type of attribute may be a "trace key", which may refer to a certain information field in a transaction log. Another type of attribute may be a "trace key value", which refers to a specific value of a trace key. As referred to herein, a "trace key-value pair" refers to a specification of a trace key along with a value for the trace key.

For example, a trace key may refer to a CallerID, which is the recognized telephone number of the caller. By specifying CallerID as the trace key, a number of transaction logs storing the CallerID may be designated. By specifying the trace key-value pair, CallerID=8092551234, the transaction logs containing a CallerID and further containing the CallerID phone number 809-255-1234 may be designated.

In certain examples, the transaction may be selected from a list of previous transactions. The transaction may be specific to a type of CTI application. In some embodiments, information specifying the transaction is received along with the request for information.

Transaction logs from applications in the CTI environment may then be retrieved (operation 204). Depending on the request received in operation 202, transaction logs may be retrieved from certain application instances or types or both in operation 204. The request in operation 202 may include access information for the transaction logs. In certain embodiments, operation 204 is performed automatically without additional user input by CTI log application 110. That is, CTI log application 110 may automatically connect to at least one of CTI enterprise servers 120, and retrieve transaction logs from a server storage system. In some cases, the access information includes a file-system directory identifier for a file containing the transaction log data for an application. On some servers, the transaction log for an application is stored on a database and the access information includes a database object identifier for accessing the log. The relevant transactions logs may be retrieved and copied to a storage local to CTI log application 110 in operation 204. The retrieval in operation 204 may include decompressing a compressed transaction log.

Method 200 may then determine which transaction logs include an indication of the transaction (operation 206). The retrieved transaction logs may be searched for a specific trace key-value pair in operation 206. For example, for a trace key of CallDate, a value of 01/01/2000 may be specified, such that all transaction logs containing transactions on this date are identified. Determining the transaction logs may further include determining which application instance, application type, and which specific servers are associated with the indicated transaction.

Transaction log information and application information indicating the transaction may be output (operation 208). In some instances, information is output in HTML format in operation 208. The information output in operation 208 may permit an analysis of which applications and application types were discovered indicating the transaction, and which information about how the transaction was processed is available.

Figure 3:
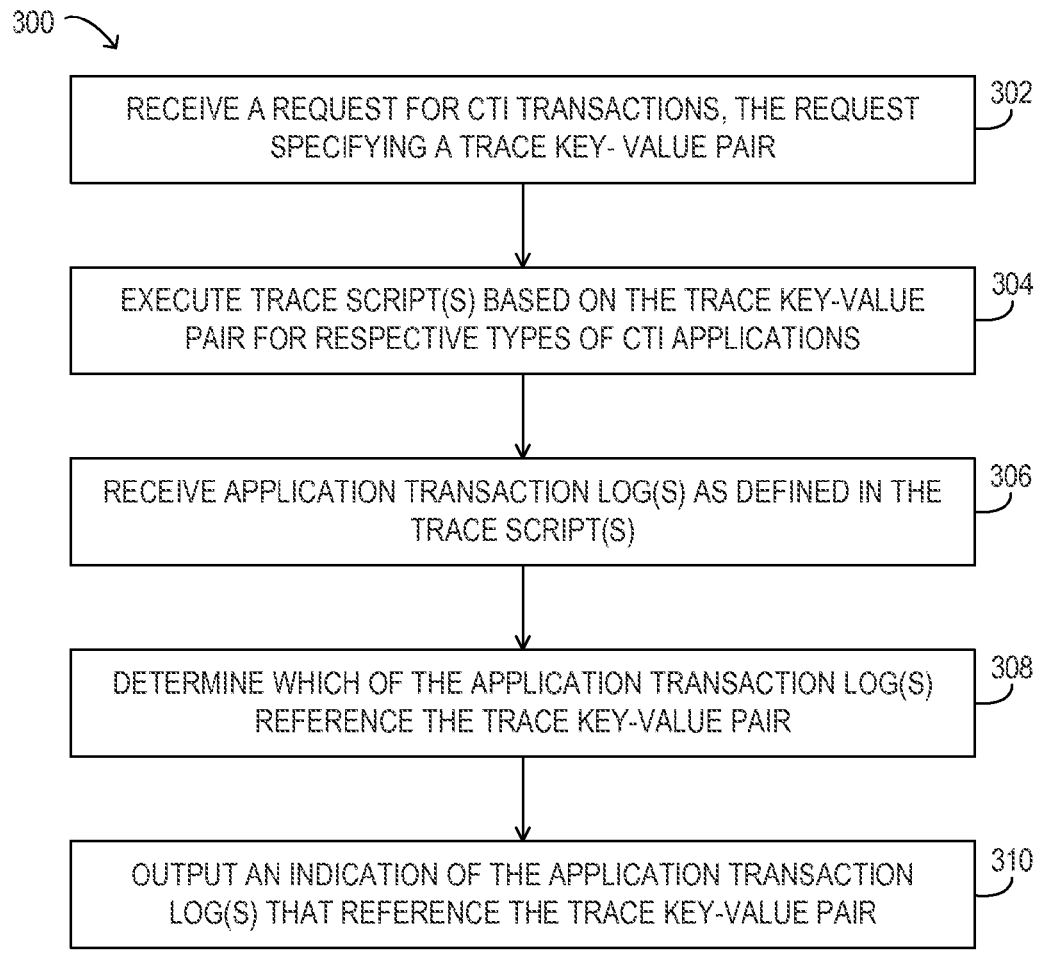
FIG. 3 is a block diagram of selected elements of an embodiment of a method for analyzing transactions.

Turning now to FIG. 3, a block diagram of selected elements of an embodiment of method 300 for processing application logs is illustrated. It is noted that CTI environment 100 may be configured to execute process 300. In some embodiments, method 300 is performed in conjunction with method 200 shown in FIG. 2.

A request for CTI transactions, the request specifying a trace key-value pair, is received (operation 302). As discussed above, the trace key-value pair may be used to identify certain CTI applications, and/or CTI transactions. Based on the trace key-value pair, at least one trace script for respective types of CTI applications may be executed (operation 304). The selection of which trace scripts to be executed in operation 304 may be based on the trace key given by the trace key-value pair. The trace key-value pair may include at least one of a connection identifier, a call identifier, a caller identifier, a date/time identifier, and a CTI environment identifier. A trace script may include instructions to retrieve one or more application transaction logs for CTI applications, and may include access information for the application transaction logs. A trace script may be generated to include CTI applications, which include information for a given trace key. The application transaction log(s) as defined in the trace script(s) may then be received (operation 306).

The application transaction logs which reference the trace key-value pair may then be determined (operation 308). In some embodiments, a list of specific transactions referencing the trace key-value pair is generated. An indication of the application transaction log(s) that reference the trace key-value pair may be output (operation 310). In certain cases, the output is a display of relevant application transaction logs, along with an indication of the corresponding CTI application type and server information. Output in the form of data files, hardcopies and database entries may also be generated in certain implementations.

Figure 4:
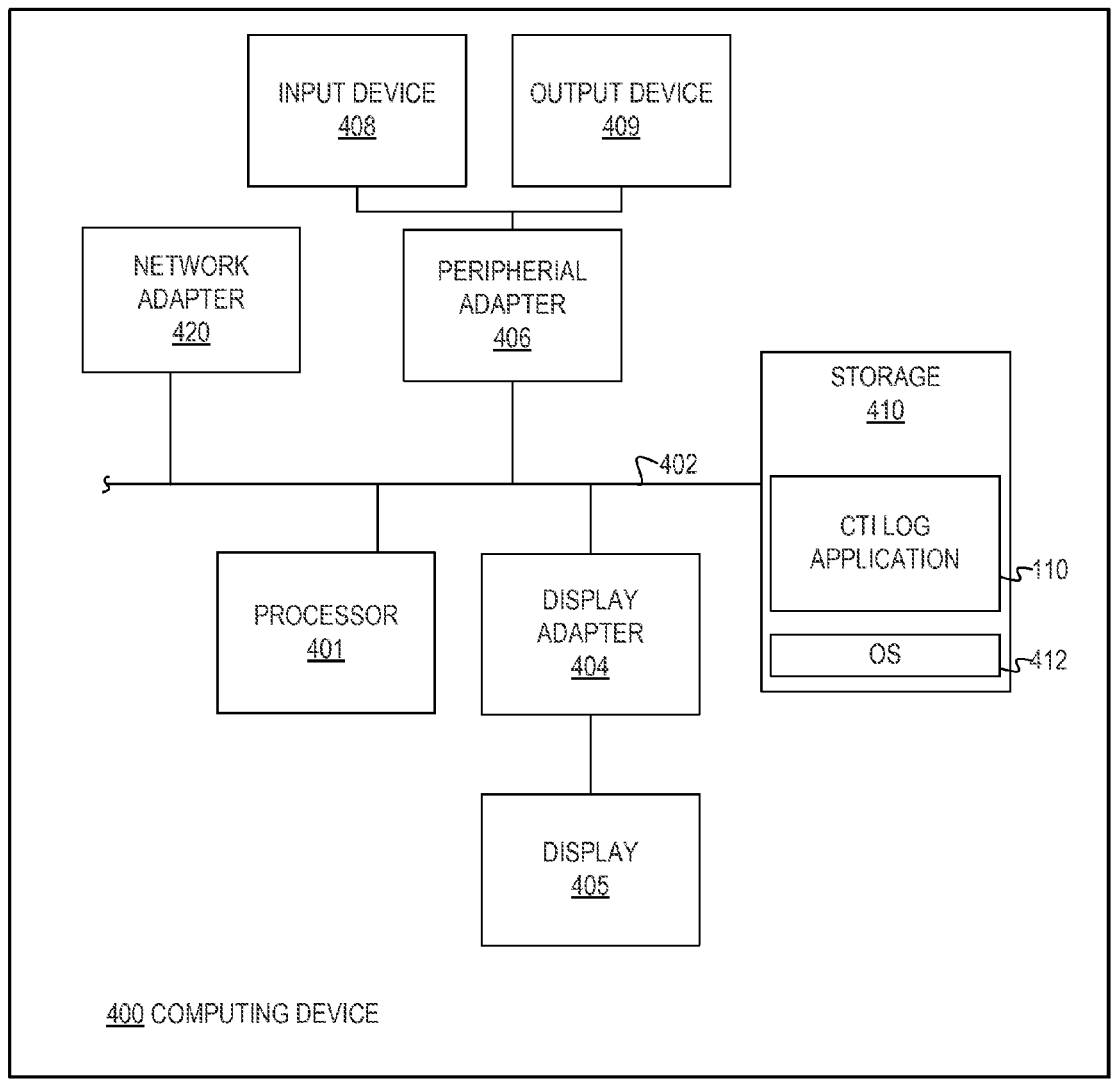
FIG. 4 is a block diagram of selected elements of an embodiment of a computing device.

Referring now to FIG. 4, a block diagram illustrating selected elements of an embodiment of a computing device 400 is presented. In the embodiment depicted in FIG. 4, device 400 includes processor 401 coupled via shared bus 402 to storage media collectively identified as storage 410.

Device 400, as depicted in FIG. 4, further includes network adapter 420 that interfaces device 400 to a network (not shown in FIG. 4). In embodiments suitable for use in processing application logs, device 400, as depicted in FIG. 4, may include peripheral adapter 406, which provides connectivity for the use of input device 408 and output device 409. Input device 408 may represent a device for user input, such as a keyboard or a mouse, or even a video camera. Output device 409 may represent a device for providing signals or indications to a user, such as loudspeakers for generating audio signals.

Device 400 is shown in FIG. 4 including display adapter 404 and further includes a display device or, more simply, a display 405. Display adapter 404 may interface shared bus 402, or another bus, with an output port for one or more displays, such as display 405 Display 405 may be implemented as a liquid crystal display screen, a computer monitor, a television or the like. Display 405 may comply with a display standard for the corresponding type of display. Standards for computer monitors include analog standards such as video graphics array (VGA), extended graphics array (XGA), etc., or digital standards such as digital visual interface (DVI), high definition multimedia interface (HDMI), among others. A television display may comply with standards such as National Television System Committee (NTSC), Phase Alternating Line (PAL), or another suitable standard. Display 405 may include an output device 409, such as one or more integrated speakers to play audio content, or may include an input device 408, such as a microphone or video camera.

Storage 410 encompasses persistent and volatile media, fixed and removable media, and magnetic and semiconductor media. Storage 410 is operable to store instructions, data, or both. Storage 410 as shown includes sets or sequences of instructions, namely, an operating system 412, and CTI log application 110, as described above. Operating system 412 may be a UNIX or UNIX-like operating system, a Windows® family operating system, or another suitable operating system.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A computer-implemented method, comprising:
    responsive to receiving a request for information associated with a call transaction for a call processed in a computer telephony integration environment, retrieving a plurality of transaction logs from a respective plurality of applications that log times and locations of calls processed in the computer telephony integration environment;
    searching the plurality of transaction logs for a trace key-value pair;
    identifying a subset of the plurality of the transaction logs that match the trace key-value pair; and
    displaying information indicative of the subset of the plurality of transaction logs.

2. A system for analyzing transactions in a computer telephony integration environment, comprising:
    a processor; and
    a memory storing instructions that, when executed by the processor, perform operations, comprising:
    receiving a request specifying a trace key-value pair identifying a calling number;
    retrieving a plurality of transaction logs from a respective plurality of applications that log times and locations of calls processed in the computer telephony integration environment;
    searching the plurality of transaction logs for matches of the trace key-value pair;
    generating a subset of the plurality of transaction logs having entries that match the trace key-value pair; and
    executing a trace script to retrieve the entries in the subset of the plurality of transaction logs that match the trace key-value pair.

3. A non-transitory computer-readable storage medium, including stored processor-executable instructions that, when executed by a processor, perform operations for processing application logs in a computer telephony integration environment, the operations comprising:
    receiving a call at an interactive voice response application in the computer telephony integration environment;
    receiving a request specifying a trace key-value pair identifying a calling number of the call;
    retrieving a plurality of transaction logs from remote servers executing applications that log times and locations of calls processed by the interactive voice response application in the computer telephony integration environment;
    searching the plurality of transaction logs for matches of the trace key-value pair;
    generating a subset of the plurality of transaction logs having entries that match the trace key-value pair;
    identifying transactions represented by the entries in the subset of the plurality of transaction logs that match the trace key-value pair; and
    enabling speech recognition in the interactive voice response application that responds to voice commands of a user to access information representing the transactions.

4. The computer-implemented method of claim 1, further comprising generating the plurality of transaction logs.

5. The computer-implemented method of claim 1, further comprising generating one of the plurality of transaction logs.

6. The computer-implemented method of claim 1, further comprising receiving a connection identifier.

7. The computer-implemented method of claim 1, further comprising receiving a call identifier.

8. The computer-implemented method of claim 1, further comprising receiving a caller identifier.

9. The computer-implemented method of claim 1, further comprising receiving a date and time.

10. The system of claim 2, wherein the operations further comprise generating the plurality of transaction logs.

11. The system of claim 2, wherein the operations further comprise generating one of the plurality of transaction logs.

12. The system of claim 2, wherein the operations further comprise receiving a connection identifier.

13. The system of claim 2, wherein the operations further comprise receiving a call identifier.

14. The system of claim 2, wherein the operations further comprise receiving a caller identifier.

15. The system of claim 2, wherein the operations further comprise receiving a date and time.

16. The non-transitory computer-readable storage medium of claim 3, wherein the operations further comprise generating the plurality of transaction logs.

17. The non-transitory computer-readable storage medium of claim 3, wherein the operations further comprise generating one of the plurality of transaction logs.

18. The non-transitory computer-readable storage medium of claim 3, wherein the operations further comprise receiving a connection identifier.

19. The non-transitory computer-readable storage medium of claim 3, wherein the operations further comprise receiving a call identifier.

20. The non-transitory computer-readable storage medium of claim 3, wherein the operations further comprise receiving a caller identifier.

* * * * *